US010442341B2

(12) United States Patent
Roeckl et al.

(10) Patent No.: US 10,442,341 B2
(45) Date of Patent: Oct. 15, 2019

(54) MOTOR VEHICLE HEADLAMP SYSTEM, MOTOR VEHICLE, METHOD FOR OPERATING A MOTOR VEHICLE HEADLAMP SYSTEM AS WELL AS COMPUTER PROGRAM PRODUCT

(71) Applicant: GM GLOBAL TECHNOLOGY OPERATIONS LLC, Detroit, MI (US)

(72) Inventors: Philipp Roeckl, Aschaffenburg (DE); Frank Langkabel, Rüsselsheim (DE); Rouven Haberkorn, Darmstadt (DE); Ingolf Schneider, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/976,570

(22) Filed: Dec. 21, 2015

(65) Prior Publication Data
US 2016/0176334 A1    Jun. 23, 2016

(30) Foreign Application Priority Data
Dec. 22, 2014  (DE) .................. 10 2014 019 420

(51) Int. Cl.
*B60Q 1/02*     (2006.01)
*B60Q 1/08*     (2006.01)

(52) U.S. Cl.
CPC .......... *B60Q 1/085* (2013.01); *B60Q 2300/23* (2013.01); *B60Q 2300/42* (2013.01); *B60Q 2300/45* (2013.01)

(58) Field of Classification Search
CPC ............ B60Q 2300/41; B60Q 2300/42; B60Q 1/143; B60Q 1/2665; B60Q 3/023;
(Continued)

(56) References Cited

U.S. PATENT DOCUMENTS

2010/0214791 A1* 8/2010 Schofield ............. B60Q 1/1423
                                                    362/466
2014/0247352 A1* 9/2014 Rathi ...................... B60R 1/00
                                                    348/148

FOREIGN PATENT DOCUMENTS

DE          10354104 A1    6/2005
DE     102005036002 A1    2/2007
(Continued)

OTHER PUBLICATIONS

German Patent Office, German Search Report for German Application No. 102014019420.5, dated Nov. 30, 2015.

*Primary Examiner* — Monica C King
(74) *Attorney, Agent, or Firm* — Lorenz & Kopf, LLP.

(57) ABSTRACT

A vehicle headlamp system with at least one headlamp, wherein the headlamp is designed to emit a variable light distribution, at least one driver monitoring device for detecting the viewing direction of a driver, an environmental monitoring device for monitoring the environment of the motor vehicle and detecting at least one object in the environment of the motor vehicle, a memory connected with the environmental monitoring device for storing information about the objects, and a controller that is connected with the memory and driver monitoring device, which is set up to compare the location of the object with the viewing direction of the driver, wherein the controller is set up to alter the light distribution of the at least one headlamp so as to illuminate the object when the viewing direction of the driver is turned toward the object. Also described are a motor vehicle, a method for operating a motor vehicle headlamp system, as well as a computer program product.

15 Claims, 2 Drawing Sheets

(58) Field of Classification Search
CPC .......... B60Q 1/06; B60Q 1/22; B60Q 1/2661;
B60Q 1/323; B60Q 1/503; B60Q 1/54;
B60Q 3/004; B60Q 1/00; B60Q 1/52;
B60Q 1/085; B60Q 1/1423; B60Q
2300/056; B60Q 2300/112; B60Q
2300/122; G06K 9/00798; G06K
9/00805; G06K 9/00791; G06K 9/4633;
B60R 1/00; B60R 2300/105; B60R
2300/607; B60R 2300/303; B60R
2300/306
See application file for complete search history.

(56) References Cited

FOREIGN PATENT DOCUMENTS

| | | |
|---|---|---|
| DE | 102009048619 A1 | 6/2010 |
| EP | 2700536 A2 | 2/2014 |

* cited by examiner

MOTOR VEHICLE HEADLAMP SYSTEM, MOTOR VEHICLE, METHOD FOR OPERATING A MOTOR VEHICLE HEADLAMP SYSTEM AS WELL AS COMPUTER PROGRAM PRODUCT

CROSS-REFERENCE TO RELATED APPLICATION

This application claims priority to German Patent Application No. 102014019420.5, filed Dec. 22, 2014, which is incorporated herein by reference in its entirety.

TECHNICAL FIELD

The present disclosure pertains to a motor vehicle headlamp system, a motor vehicle, a method for operating a motor vehicle headlamp system as well as a computer program product. The motor vehicle headlamp system exhibits at least one headlamp, which is designed to emit a variable light distribution. Also provided is at least one driver monitoring device for detecting the viewing direction of a driver.

BACKGROUND

Generally known from automotive engineering in particular is to provide different types of headlamps, which are directed in the traveling direction, with it being possible to switch between the latter as needed, such as low beams, high beams, fog lamps and the like. In addition, it is known on the one hand to provide manually steerable headlamps, for example to aim them at signs or, in all-terrain vehicles, to scan the terrain.

On the other hand, automatically controlled headlamps have more recently also been provided, which are controlled either as a function of a traversed curve radius, a yaw rate or a lateral acceleration of the vehicle, or which are coupled with a navigation system that enables predictions about the type of traveled road.

DE 10 2005 036 002 A1 discloses a method for controlling an illuminating device of a vehicle driven by an operator, which acquires the viewing direction of the operator on the road lying ahead, wherein at least one parameter for at least one settable and adjustable headlamp of the illuminating device is set as a function of the information acquired about the viewing direction. In addition, a corresponding headlamp system is described.

The disadvantage to known headlamp systems, motor vehicles and methods is that systems controlled by viewing direction emit light distributions that follow rapid changes in viewing direction. The resultant constantly changing light distributions may prove irritating, and negatively affect driving safety. In addition, for example when reading what are normally relatively highly placed traffic signs, looking up with the light may cross an area in which oncoming traffic can be blinded, so that this impairs the traffic safety of other road users.

SUMMARY

In accordance with herein described embodiments of the invention, a motor vehicle headlamp system, a motor vehicle, a method for operating a motor vehicle headlamp system, as well as a computer program product are provided that may be operated to enable a variable light distribution.

A motor vehicle headlamp system according to a first aspect exhibits at least one headlamp designed for emitting a variable light distribution. Such a variable light distribution can involve a change in the light center, brightness distribution, beam shape and the like.

Further provided is a driver monitoring device for detecting the viewing direction of a driver of the motor vehicle. Such a driver monitoring system can determine the viewing direction of the driver based on various criteria, for example the head posture and position of the eyes.

Also provided is an environmental monitoring device for monitoring the environment of the motor vehicle and detecting at least one object in the environment of the motor vehicle. For example, corresponding objects can include individuals, animals, road signs, motor vehicles, obstacles or the like.

Additionally provided is a memory connected with the environmental monitoring device for storing information about the objects detected by means of the environmental monitoring device. The memory can be a temporary memory, which deletes the stored information about the detected objects as soon as the latter are no longer relevant for the motor vehicle, for example because the motor vehicle has passed the objects.

Additionally provided is a controller that is connected with the memory, the driver monitoring device as well as the at least one headlamp, wherein the controller is set up to compare the location of the object with the viewing direction of the driver, wherein the controller is further set up to alter the light distribution of the at least one headlamp so as to illuminate the object when the viewing direction of the driver is turned toward the object.

By combining object detection with viewing direction detection and comparing the viewing direction with the location of the object, it can be determined when a driver is viewing a corresponding object, or at least looking in its direction. As a consequence, the variable light distribution can be set in such a way as to illuminate the object when the driver looks in the direction of the object. In addition, linking the viewing direction of the driver with the location of one or more specific objects detected in advance makes it easier to distinguish between a wandering gaze and focused look of the driver. This makes it possible to provide a calmer lighting pattern and a more targeted illumination than with conventional known systems.

A first additional aspect of the motor vehicle headlamp system can provide that the environmental monitoring device be designed to track the detected objects. In this way, the location of the detected objects relative to the motor vehicle can be tracked. In addition, this makes it possible to detect and process movements of the object itself, e.g., even for other purposes, such as a collision warning.

Another additional aspect can provide that the controller be set up to dynamically track the light distribution of the at least one headlamp for illuminating the object. This makes it possible to continuously illuminate the object even given a change in relative position due to the drive or movements by the object itself. The variable light distribution of the headlamp can be altered with respect to both the direction and shape of the variable light distribution. For example, when a motor vehicle equipped with a corresponding headlamp drives toward a sign gantry, the location of the sign gantry relative to the headlamp changes on the one hand, but also its spatial angle or size on the other. By tracking the sign gantry and dynamically adjusting the illumination of the object given a changing relative position, it becomes possible to illuminate the respective complete sign gantry (or respectively identical areas). In an embodiment, the variable light distribution can also be changeable in terms of intensity, as a result of which the perceived brightness of the object only changes negligibly if at all.

Another additional aspect of the motor vehicle headlamp system can provide that the environmental monitoring device exhibit at least one camera pointed in the traveling direction. The camera can be a stereo camera. A corresponding camera can identify and characterize objects using optical methods. The use of stereo cameras makes it easy to identify spatial information about the objects.

In another embodiment, the environmental monitoring device can exhibit at least one panoramic camera. Such a panoramic camera, also referred to as a 360° camera, can also be used in combination with a camera pointed in the traveling direction, and can generate a stereo image in conjunction with the latter in several additional embodiments.

In another embodiment, the environmental monitoring device can additionally or alternatively exhibit more sensors, which are suitable for acquiring and detecting objects, for example radar sensors or Lidar sensors. Such sensors are useful in particular when driving in darkness.

Another additional aspect of the motor vehicle headlamp system provides that the at least one headlamp is a matrix headlamp. Matrix headlamps exhibit a plurality of individual light elements that can be connected individually and/or in groups and/or have a variable brightness. Such matrix headlamps can be used to generate variable light distributions in particularly diverse ways. Furthermore, some embodiments of matrix headlamps can do without mechanical adjusting means, which increases the durability of corresponding headlamps.

Another further aspect of the motor vehicle headlamp system described here provides that the driver monitoring system exhibits an interior camera. A corresponding interior camera can be a camera pointed at the driver or his or her head, which acquires the location of the head and eyes of the driver. A viewing direction can be derived from the location of the head and eyes. Corresponding interior cameras can be used for other purposes, for example for monitoring driver fatigue. A corresponding interior camera can be arranged in a dashboard in certain embodiments.

A first independent aspect described here relates to a motor vehicle with a motor vehicle headlamp system of the aforementioned kind. In an embodiment, the motor vehicle can exhibit more than one headlamp, in particular two headlamps, which can be activated in the corresponding manner.

Another aspect described here relates to a method for operating a motor vehicle headlamp system. The motor vehicle headlamp system exhibits at least one headlamp, which is designed to emit a variable light distribution, a driver monitoring device for detecting the viewing direction of a driver, and an environmental monitoring device for monitoring the environment of the motor vehicle, and for detecting at least one object in the environment of the motor vehicle.

In a first aspect of the method, the environmental monitoring system is used to acquire the location of at least one object and a viewing direction of the driver, wherein the location of the object is compared with the viewing direction of the driver, and if the viewing direction of the driver lines up with the direction of the object, the light distribution of the at least one headlamp is changed in such a way as to illuminate the detected object. Linking the detection of an object with the adjustment of a variable light distribution in this way so as to illuminate the detected object ensures that the respective object is illuminated. As a consequence, the variable light distribution can be targeted more precisely, and in particular generate a calmer lighting impression that distracts the driver to less of an extent than fidgety lighting that follows the viewing direction without any link to detected objects.

A first additional embodiment of the method can provide that a memory connected with the environmental monitoring system be provided, wherein information about the at least one object is stored in the memory. A corresponding memory can be a temporary memory, from which data about the object are deleted when no longer of any relevance.

An additional aspect of the method described here can provide that the location of the at least one object is tracked. Object tracking makes it possible to detect the location of the object relative to the motor vehicle, which can change due to the movement of the motor vehicle and/or due to the movement of the object. By tracking the location of the object, the variable light distribution of the headlamp can be altered in such a way that the object remains illuminated even given a change in location. This allows the driver to more easily detect the object or information about the object, or information contained on the object, for example a traffic sign or sign gantry.

An additional aspect of the described method can provide that the object be classified by its type. For example, classification makes it possible to distinguish between living beings, in particular individuals, and inanimate objects. In addition, specific objects, such as traffic signs, can be detected. In some additional embodiments, this makes it possible to alter the variable light distribution specific to an object, for example to select the brightness level given highly reflective traffic signs in such a way that a driver is not blinded by the reflected light.

Another additional aspect of the method can provide that an object not be illuminated if the object is detected as an oncoming vehicle, in particular an oncoming motor vehicle. This makes it possible not to illuminate oncoming vehicles being viewed by the driver of the motor vehicle, and not to blind their drivers.

Another additional aspect can provide that the object continue to be illuminated given an altered viewing direction of the driver. The object can be kept illuminated for a specific period of time or until the object lies outside the field of interest or outside the lighting range of the headlamps.

Another subject described here involves a device for operating a motor vehicle headlamp system, which exhibits at least one headlamp, which is designed to emit a variable light distribution, wherein a driver monitoring device for detecting a viewing direction of a driver and an environmental monitoring device for monitoring the environment of the motor vehicle and detecting objects in the environment of the motor vehicle are provided. The environmental monitoring device is set up to acquire the location of an object, wherein means are provided that are designed to compare the location of the object with the viewing direction of the driver, wherein the means are further designed to control the at least one headlamp in such a way that, when the viewing direction of the driver lines up with the direction of the object, the light distribution of the at least one headlamp is changed in such a way as to illuminate the object.

A first additional aspect of the device provides that a memory be connected with the environmental monitoring device, which is provided for storing information about the at least one object. For example, this information can encompass the current location, a trajectory, a movement by the object itself, or the like. The memory can be a temporary memory.

Another aspect of the device may be designed to track the location of the at least one object.

Another aspect of the device can provide for classifying the object by its type.

Another additional aspect can provide that the device exhibit be capable of detecting an oncoming vehicle as such, wherein it is possible to suppress the illumination of the oncoming vehicle.

Another aspect of the device can provide for keeping the object illuminated given a change in the viewing direction of the driver. One, several or all of the aforementioned means can be realized in the form of a controller and/or computing unit. The controller can exhibit a computing unit.

Another independent subject relates to a computer program product with a computer-readable storage medium, on which are embedded commands that, when executed by a computing unit, set the computing unit up to implement a method according to the aspects described above. The storage medium can be a memory, the computing unit can be the controller of a motor vehicle.

BRIEF DESCRIPTION OF THE DRAWINGS

The present invention will hereinafter be described in conjunction with the following drawing figures, wherein like numerals denote like elements.

DETAILED DESCRIPTION

Figures 1, 2:
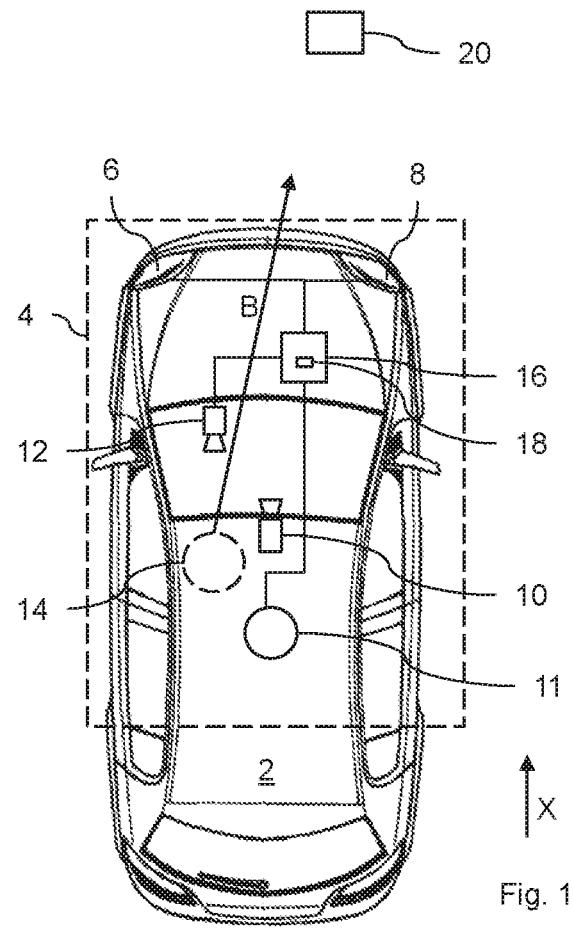
FIG. 1 is a top view of a motor vehicle with a motor vehicle headlamp system, as well as on FIGS. 2 to 4 are various phases of a driving situation from a driver perspective.

The following detailed description is merely exemplary in nature and is not intended to limit the invention or the application and uses of the invention. Furthermore, there is no intention to be bound by any theory presented in the preceding background of the invention or the following detailed description.

The motor vehicle exhibits a motor vehicle headlamp system 4. The motor vehicle headlamp system 4 has a plurality of components, which are framed by dashed lines.

The motor vehicle headlamp system 4 exhibits two front headlamps 6, 8, which both are designed as matrix headlamps. The front headlamps 6, 8 are thus designed to emit a variable light distribution. The variable light distribution can generate different light distributions by selectively turning matrix elements on and off. Some headlamp configurations can also vary aspects other than light distribution, for example light output, overall brightness and/or brightness distribution.

The motor vehicle headlamp system 4 exhibits a front camera 10. The front camera 10 is pointed in the traveling direction X. The front camera 10 acquires an area lying ahead of the motor vehicle 2. In some embodiments, the front camera 10 can be designed as a stereo camera.

Provided in addition to the front camera 10 is a 360° panoramic camera 11. The 360° panoramic camera 11 can be used to also detect objects in the environment of the motor vehicle 2. In some variants, the 360° panoramic camera 11 can exhibit several camera elements, whose images put together yield a panoramic view. Unlike the depictions, these types of cameras can also be distributed on the motor vehicle, so that the motor vehicle body has no shading effect on the camera image(s) of the 360° panoramic camera 11.

Also provided is an interior camera 12, which is pointed toward the head of a driver 14, and which can detect the viewing direction B of the driver by recognizing the location of the head of the driver 14 and his or her eyes, as well as what they are focusing on.

The front headlamps 6, 8 the front camera 10 as well as the interior camera 12 are connected with a controller 16.

One component of the controller 16 is a memory 18. Stored in the memory 18 on the one hand is a computer program, which when loaded by the controller 16 and executed, serves to control the front headlamps 6, 8 in the manner described here. In addition, temporarily information about objects is stored in the memory 18.

Located ahead of the motor vehicle 2 is an object 20, which is acquired by the front camera 10. The controller 16 uses algorithms for image analysis, which detects the object 20 as such from the camera image of the front camera 10. The location of the object 20 is determined from the location of the object 20 relative to the motor vehicle. In some embodiments, object tracking information can also be determined.

Objects such as the object 20, which are acquired by the front camera 10, the panoramic camera 11 or both, are temporarily stored in the memory 18. The objects 20 can be deleted from the memory 18 once they have no more relevance for the motor vehicle 2 or driver 14, for example once the objects have been passed.

At the same time, the interior camera 12 determines the viewing direction B of the driver 14. The viewing direction B of the driver 14 is compared with the location of the object 20 relative to the motor vehicle. The comparison allows the controller 16 to determine whether the driver 14 is directing his or her gaze toward the object 20. If the viewing direction B of the driver 14 coincides with the location of the object 20, the controller 16 can determine that the driver 14 is looking at the object 20. As soon as this is the case, the controller 16 sends out control signals to the front headlamps 6, 8, so that they configure the light distribution in such a way as to illuminate the object 20. This improves the detectability of the object 20.

The motor vehicle headlamp system 4 can be configured in such a way that the viewing direction B of the driver 14 need not be aimed completely at the object 20. Specific tolerances or blurriness ranges can be defined that also cause the object 20 to be illuminated if the viewing direction B does not point directly at the object 20, but centers around the object 20 within a specific tolerance range.

In addition, a change in the viewing direction B of the driver can be tracked in some embodiments, and when it is anticipated that the driver will soon be looking at the object 20, an adjustment of the light distribution of the front headlamps 6, 8 can already be initiated in such a way as to illuminate the object 20. In this way, the driver 14 can be anticipated, and the acquisition of the object 20 and its analysis or evaluation can be accelerated.

Figure 3:
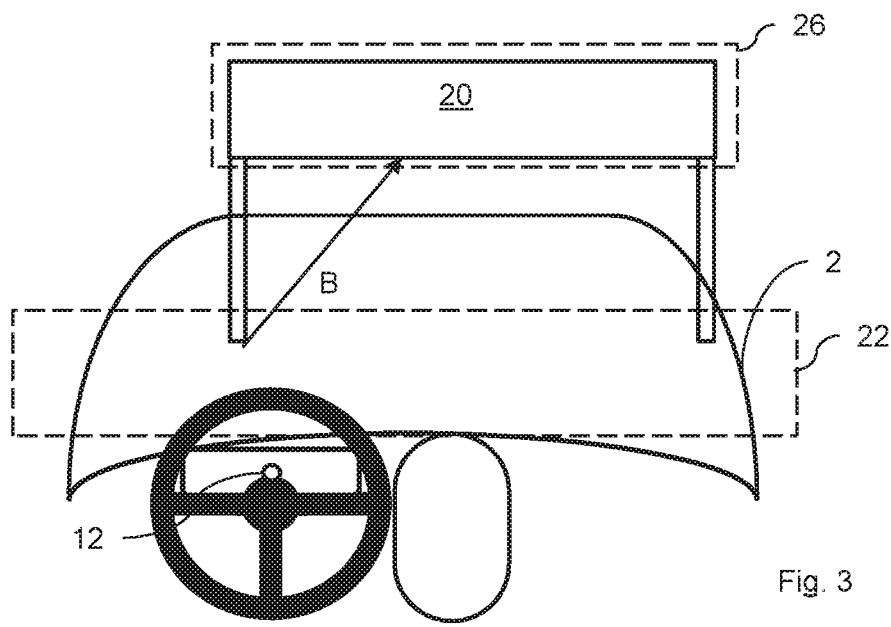
Figure 4:
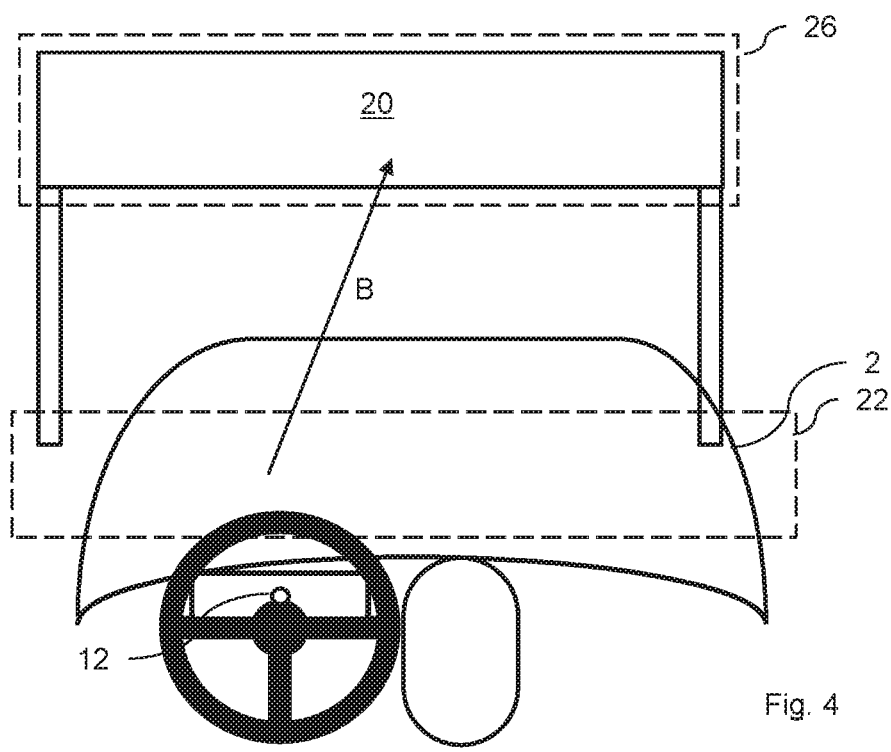

FIG. 2 to 4 show a driver perspective from the interior of the motor vehicle 2.

FIG. 2 shows a situation in which the motor vehicle 2 is driving toward a sign gantry 24 with low beams 22.

The sign gantry 24 was acquired by the front camera 10, detected as an object, marked and temporarily stored in the memory 18 of the controller. The dimensions of the sign gantry 24 were here also determined, and also stored in the memory 18. A viewing direction B of the driver changes in the direction of arrow Z toward the sign gantry 24.

The controller 16 now anticipates that the viewing direction B of the driver will turn toward the sign gantry 24, and activates the front headlamps 6, 8 in such a way that they illuminate the sign gantry 24 with ambient lighting 26, as depicted on FIG. 3. This improves the legibility of the sign gantry 24, so that the driver has to pay less attention while reading the sign gantry than when the sign gantry 24 is not illuminated in this way.

As shown on FIG. 4, the sign gantry 24 takes up a larger portion of the visible area given an approaching motor vehicle, and the location of the sign gantry 24 relative to the motor vehicle 2 changes, which apart from the distance also encompasses the angle relative to the headlamps 6, 8.

The controller 16 controls the front headlamps 6, 8 in such a way that the display area of the sign gantry 24 always remains illuminated, which requires that the light distribution be expanded in the area of the sign gantry 24, as well as that the light angle be adjusted. The sign gantry 24 remains legible.

In some embodiments, the controller 16 can be set up to keep the objects 20, 24 illuminated, even if the driver 14 does not look in the direction of the object 20, 24 for a certain time. For example, the driver 14 can temporarily look at the road ahead before returning his or her gaze back to the sign gantry 24 to continue reading the information thereon.

After passing the sign gantry 24, the lighting of the headlamps 6, 8 can be set to normal illumination again, for example to a normal low beam.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle headlamp system for a vehicle that is driven by a driver, the motor vehicle headlamp system comprising:
   at least one headlamp, wherein the headlamp is designed to emit a variable light distribution,
   at least one driver monitoring device for detecting a current viewing direction (B) of the driver relative to the vehicle,
   an environmental monitoring device for monitoring the environment of the motor vehicle and detecting at least one object in the environment of the motor vehicle,
   a memory connected with the environmental monitoring device for storing information about the objects, and
   a controller that is connected with the memory and driver monitoring device, which is set up to compare the location of the object with the detected current viewing direction (B) of the driver, wherein the controller is set up to alter the light distribution of the at least one headlamp so as to illuminate the object when the detected current viewing direction (B) of the driver is turned toward the object.

2. The motor vehicle headlamp system according to claim 1, wherein the environmental monitoring device is designed to track the detected objects.

3. The motor vehicle headlamp system according to claim 2, wherein the controller is set up to dynamically track the light distribution of the at least one headlamp for illuminating the object.

4. The motor vehicle headlamp system according to claim 1, wherein the environmental monitoring device exhibits at least one camera pointed in the traveling direction.

5. The motor vehicle headlamp system according to claim 1, wherein the environmental monitoring device exhibits at least one panoramic camera system.

6. The motor vehicle headlamp system according to claim 1, wherein the at least one headlamp is a matrix headlamp.

7. The motor vehicle headlamp system according to claim 1, wherein the driver monitoring system exhibits an interior camera.

8. A motor vehicle with a motor vehicle headlamp system according to claim 1.

9. A method for operating a vehicle headlamp system of a vehicle that is driven by a driver, the vehicle including at least one headlamp configured to emit a variable light distribution, a driver monitoring device for detecting a current viewing direction (B) of a driver relative to the vehicle, and an environmental monitoring device for monitoring the environment of the motor vehicle and detecting at least one object in the environment of the motor vehicle, wherein the method comprises:
   acquiring the location of at least one object with the environmental monitoring device,
   acquiring a viewing direction of the driver,
   comparing the location of the object with the detected current viewing direction (B) of the driver, and
   altering the light distribution of the at least one headlamp so as to illuminate the detected object when the detected current viewing direction (B) of the driver is turned toward the object.

10. The method according to claim 9, wherein a memory connected with the environmental monitoring device is provided, and the method comprises storing information about the at least one object in the memory.

11. The method according to one of claim 9, comprising tracking the location of the at least one object.

12. The method according to one of claim 9, comprising classifying the object by its type.

13. The method according to claim 12, comprising not illuminating the object if the object is detected as an oncoming vehicle.

14. The method according to one of claim 9, continuing to illuminate the object given an altered viewing direction of the driver.

15. A computer program product with a computer-readable storage medium, on which are embedded commands that, when executed by a computing unit, set the computing unit up to implement a method according to claim 9.

* * * * *